United States Patent
Windrem

(10) Patent No.: US 6,549,190 B1
(45) Date of Patent: Apr. 15, 2003

(54) GRAPHICAL SOURCE IDENTIFICATION DISPLAY

(75) Inventor: Kevin D. Windrem, Grass Valley, CA (US)

(73) Assignee: Grass Valley (US), Inc., Nevada City, CA (US)

( * ) Notice: Subject to any disclaimer, the term of this patent is extended or adjusted under 35 U.S.C. 154(b) by 0 days.

(21) Appl. No.: 09/339,358

(22) Filed: Jun. 23, 1999

(51) Int. Cl.[7] ................................................ G09G 5/00
(52) U.S. Cl. ......................... 345/168; 345/88; 345/102
(58) Field of Search .............................. 345/87, 88, 89, 345/102, 173, 174, 175, 176, 177, 178, 179, 168, 169; 341/22, 20, 23

(56) References Cited

U.S. PATENT DOCUMENTS

| | | | | |
|---|---|---|---|---|
| 4,988,837 A | * | 1/1991 | Murakami et al. | 345/173 |
| 5,295,062 A | * | 3/1994 | Fukushima | 345/173 |
| 5,297,030 A | * | 3/1994 | Vassigh et al. | 345/173 |
| 5,596,343 A | * | 1/1997 | Snider | 345/102 |
| 6,140,987 A | * | 10/2000 | Stein et al. | 345/87 |

* cited by examiner

Primary Examiner—Xiao Wu
(74) Attorney, Agent, or Firm—Smith-Hill and Bedell

(57) ABSTRACT

A graphical source ID display has a plurality of display regions aligned with respective columns of source selector buttons. Each display region has a bit-map representation, either iconic or textual, that identifies the source associated with that column. The display regions may further be backlit. The bit-map representation is entered into a display controller by an operator during setup, the display controller providing the bit-map representations to the appropriate display regions.

11 Claims, 1 Drawing Sheet

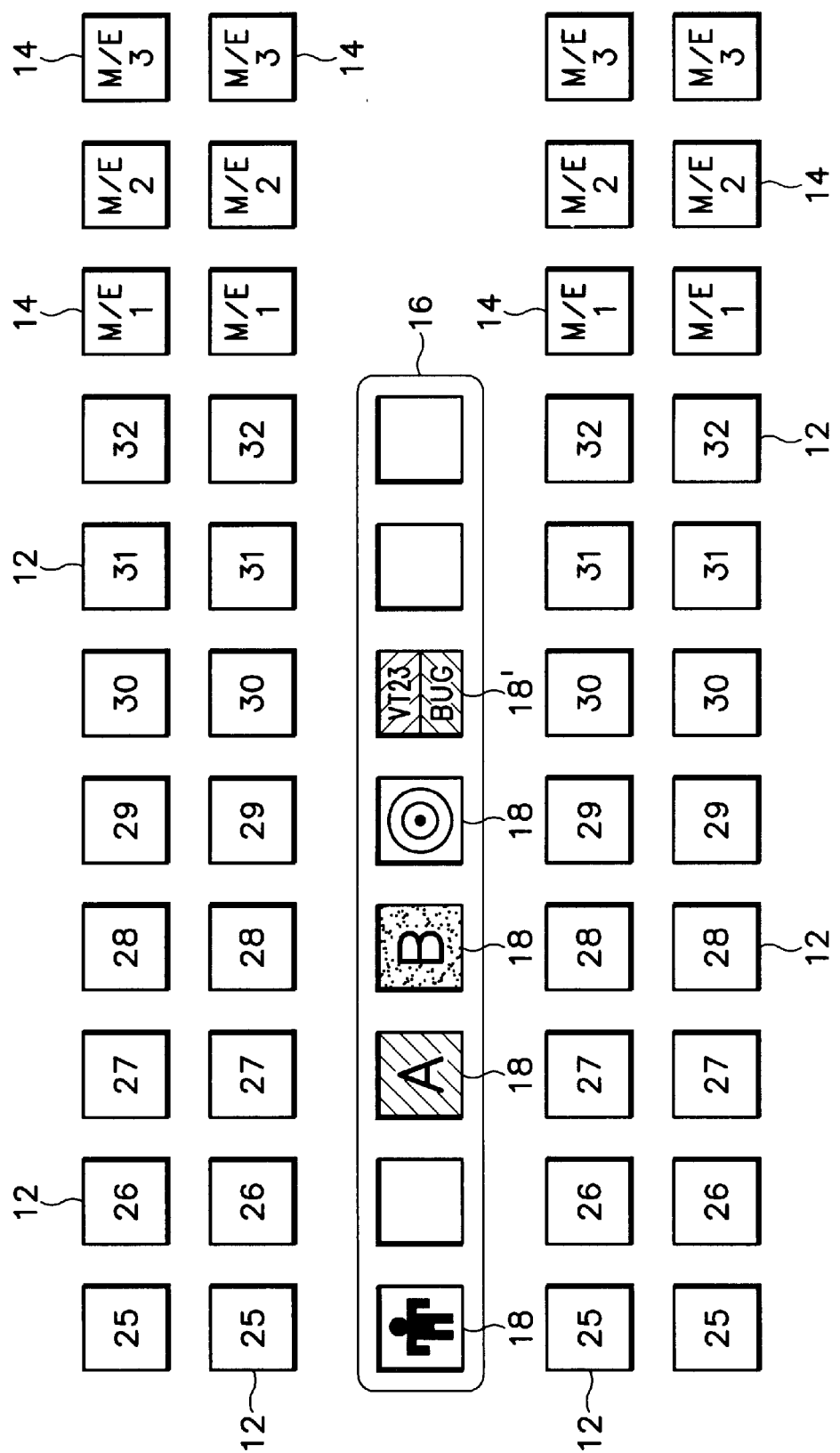

GRAPHICAL SOURCE IDENTIFICATION DISPLAY

BACKGROUND OF THE INVENTION

The present invention relates to video production switchers, and more particularly to graphical source identification (ID) displays.

The current state of the art in video production switchers is to provide simple alphanumeric displays to identify sources of video material coupled to the switcher. These alphanumeric displays typically are limited to four characters because of the space available in a source column for the switcher. Identification of a source in the shortest period of time is critical in live video production switcher operation, and technical directors have resorted to colored icons printed or drawn on paper tape placed between source selector rows on the switcher. Printing and installing source IDs in the source buttons of the switcher is considered to be inappropriate due to the time it takes and the fact that sources change from show to show and operator to operator. Most live technical directors consider four character source name displays useful only when sources change during a production, such as when the switcher is fed by a preselector like a facility router.

What is desired is an enhancement to the source ID displays on production switchers that is more like the paper tape used by today's operators.

BRIEF SUMMARY OF THE INVENTION

Accordingly the present invention provides a graphical source ID display for production switchers that aligns a bit-mapped region with each source selector column in each mix/effects (M/E) of the switcher. Each region has a graphical icon supplied by an operator that uniquely defines the source to that operator. The display region may be split to identify shifted and unshifted sources associated with that source column. In lieu of icons, text may be generated. Further the display regions may be backlit in different colors, with top and bottom regions lit in different colors.

The objects, advantages and other novel features of the present invention are apparent from the following detailed description when read in conjunction with the appended claims and attached drawing.

BRIEF DESCRIPTION OF THE SEVERAL VIEWS OF THE DRAWING

The FIGURE is a plan view of a portion of a switcher control panel showing a graphical source ID display according to the present invention.

DETAILED DESCRIPTION OF THE INVENTION

As shown in the FIGURE a portion of the control panel of a production switcher has columns of source 25–32 selector buttons 12 and M/E 1–3 select buttons 14. In the middle of the rows of source selectors is a graphical display region 16 having individual bit-map regions 18 aligned with each column. In each bit-map region 18 is displayed an icon or text material that identifies to the operator what source is coupled to that particular column of source selector buttons 12. One or more of the regions 18 may be split into two regions 18' to show shifted and unshifted sources associated with that source column button 12. The display regions 18 may be backlit in different colors, and each half of a split display region 18' may be backlit in a different color.

As shown the source for column 25 is represented by an humaniform icon, there is no source indicated associated with column 26, column 27 has a text "A" backlit with a first color, column 28 has a text "B" backlit with a second color, column 29 has a target icon, column 30 has a split display with text backlit by two different colors, and columns 31 and 32 have no associated source indicated. During system setup the operator defines the contents for each display region 18 for each source selector button 12. Text may be derived from the source name, while icons may be created using an off-the-shelf drawing package, the result of which is converted into a bit-map. The bit-map is imported into the switcher for association with the appropriate source selector buttons 12. The graphical source ID display 16 in one embodiment is an LCD assembly having a separate LCD for each display region 18, the LCD assembly being driven by an appropriate display controller (not shown). The icons and text material are imported into the display controller and associated with particular ones of the LCDs corresponding to the particular source selector buttons 12.

For three color lighting of the display regions 18 each LCD of the LCD assembly may be backlit with two color LEDs. For example a red and a green LED may be used for each display region 18 so that, if each is turned on alone, the region is backlit in red or green, but if both are turned on simultaneously the region is backlit in yellow.

Thus the present invention provides a graphical source ID display by having a bit-map display associated with each column of source selector buttons, such as an LCD assembly with an LCD for each column, which displays an icon or text material identifying to the operator the source coupled to that column.

What is claimed is:

1. A method of providing a graphical source ID display in a production switcher that allows transitions between different video pictures and includes a control panel with columns of source selector buttons, the method comprising the steps of:

providing a graphical display assembly on the control panel, the graphical display assembly having bit-map display regions associated with respective columns of source selector buttons;

identifying each source associated with each display region with a bit-map representation; and employing the graphical display assembly to display the bit-map representation within the appropriate bit-map display region.

2. The method as recited in claim 1 further comprising the step of backlighting each display region with a color.

3. The method as recited in claim 1 wherein the bit-map representation is an icon.

4. The method as recited in claim 1 wherein the bit-map representation is textual material.

5. The method as recited in claim 1 wherein the display region is split into separate sub-regions, with a separate bit-map representation in each sub-region.

6. The method as recited in claim 2 wherein the color is selected from the group consisting of red, green and yellow.

7. A production switcher that allows transitions between different video pictures, the production switcher having a graphical source ID display comprising:

a control panel having columns of source selector buttons, one column for one source; and a display assembly situated on the control panel and having a plurality of display regions, one display region for each column, with the display regions being aligned with the columns and each display region having a bit-map representation identifying for an operator the source coupled to that column.

8. The production switcher as recited in claim 7 wherein the bit-map representation is split to show shifted and unshifted sources associated with the column.

9. The production switcher as recited in claim 7 wherein the display assembly is an LCD assembly having a separate LCD for each column.

10. The production switcher as recited in claim 7 further comprising an LED situated behind each display region to provide backlighting for the display region.

11. The production switcher as recited in claim 10 wherein the LED is a pair of LEDs of different colors to provide at least three colors for backlighting each display region.

* * * * *